US010987641B2

(12) United States Patent
Akiyama (10) Patent No.: US 10,987,641 B2
(45) Date of Patent: Apr. 27, 2021

(54) MANUFACTURING METHOD AND MANUFACTURING APPARATUS THAT INCLUDES BLADES HAVING INCLINED SURFACES FOR MANUFACTURING A GRANULATED BODY (71) Applicant: TOYOTA JIDOSHA KABUSHIKI KAISHA, Toyota (JP)

(72) Inventor: Naohisa Akiyama, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 218 days.

(21) Appl. No.: 16/110,492

(22) Filed: Aug. 23, 2018

(65) Prior Publication Data
US 2019/0076797 A1 Mar. 14, 2019

(30) Foreign Application Priority Data
Sep. 12, 2017 (JP) .............................. JP2017-175045

(51) Int. Cl.
B01F 3/12 (2006.01)
B29B 7/00 (2006.01)
(Continued)

(52) U.S. Cl.
CPC ............ B01F 3/1221 (2013.01); B01F 7/041 (2013.01); B01F 7/042 (2013.01); B01F 7/043 (2013.01); B01F 13/1016 (2013.01); B01F 13/1027 (2013.01); B01F 13/1044 (2013.01); B01J 2/10 (2013.01); B02C 18/145 (2013.01);
(Continued)

(58) Field of Classification Search
CPC ........ B01F 3/1221; B01F 7/042; B01F 7/043; B01F 13/1044; B01F 13/1016; B01F 2215/0481; B01F 2013/108; B01F 2013/1052; B01F 2215/0422; B01F 7/041; B01F 13/1027; B01F 13/1041; B01F 13/1047; B01J 2/10; B01J 2/00;
(Continued)

(56) References Cited
U.S. PATENT DOCUMENTS 1,013,612 A * 1/1912 Peters ..................... F28F 13/12
165/109.1
2,104,191 A * 1/1938 Flynn .................... B28C 9/0454
366/15
(Continued)

FOREIGN PATENT DOCUMENTS

CN 203829936 U 9/2014
DE 1157894 B * 11/1963 .......... B01F 13/1027
(Continued)

Primary Examiner — Charles Cooley
(74) Attorney, Agent, or Firm — Sughrue Mion, PLLC (57) ABSTRACT A manufacturing method for a granulated body includes supplying powder agitated by a dry agitator to a wet agitator, and agitating the powder supplied from the dry agitator with a liquid component in the wet agitator by rotating blades that have inclined surfaces, so as to form a granulated body. The blades are rotated when the powder is supplied to the wet agitator from the dry agitator. The dry agitator agitates the powder in a dry state, and the wet agitator is positioned below the dry agitator. The wet agitator includes an agitation chamber and the blades rotating around a center axis orthogonal to a direction in which the powder is supplied.

13 Claims, 8 Drawing Sheets (51) Int. Cl.
  *B29B 7/46* (2006.01)
  *B01F 7/04* (2006.01)
  *B01F 13/10* (2006.01)
  *B02C 23/36* (2006.01)
  *B02C 18/14* (2006.01)
  *B01J 2/10* (2006.01)

(52) U.S. Cl.
  CPC .............. *B02C 23/36* (2013.01); *B29B 7/007* (2013.01); *B29B 7/46* (2013.01); *B01F 2013/108* (2013.01); *B01F 2013/1052* (2013.01); *B01F 2215/0422* (2013.01); *B01F 2215/0481* (2013.01)

(58) Field of Classification Search
  CPC .......... B29B 7/007; B29B 7/46; B02C 23/36; B02C 18/145
  USPC ................................................ 366/290–291
  See application file for complete search history.

(56) References Cited

U.S. PATENT DOCUMENTS

| | | | | |
|---|---|---|---|---|
| 2,235,311 | A | * | 3/1941 | Bullard ............... F27B 5/02 |
| | | | | 432/132 |
| 2,735,662 | A | * | 2/1956 | Wickland ............. B22C 5/04 |
| | | | | 366/103 |
| 4,655,701 | A | | 4/1987 | Moriya |
| 6,709,146 | B1 | * | 3/2004 | Little ............. B01F 7/00025 |
| | | | | 366/76.3 |
| 9,022,306 | B2 | * | 5/2015 | Rice .................... B29B 7/16 |
| | | | | 241/27 |
| 9,387,640 | B1 | * | 7/2016 | Rice .................. B29B 17/04 |
| 9,821,283 | B1 | * | 11/2017 | Brough ................. A61J 3/07 |
| 2017/0232409 | A1 | * | 8/2017 | Brough ................. A61J 3/02 |
| | | | | 366/325.1 |
| 2019/0076797 | A1 | * | 3/2019 | Akiyama ........... B01F 13/1016 |
| 2019/0099726 | A1 | * | 4/2019 | Akiyama ................ B01J 2/10 |

FOREIGN PATENT DOCUMENTS

| | | |
|---|---|---|
| JP | 59-55338 A | 3/1984 |
| JP | 4-180825 A | 6/1992 |
| JP | 2005-270955 A | 10/2005 |
| JP | 2017-104784 A | 6/2017 |

* cited by examiner

FIG. 5
L TYPE

FIG. 6
R TYPE

MANUFACTURING METHOD AND MANUFACTURING APPARATUS THAT INCLUDES BLADES HAVING INCLINED SURFACES FOR MANUFACTURING A GRANULATED BODY

INCORPORATION BY REFERENCE

The disclosure of Japanese Patent Application No. 2017-175045 filed on Sep. 12, 2017 including the specification, drawings and abstract is incorporated herein by reference in its entirety.

BACKGROUND

1. Technical Field

The disclosure relates to a method and an apparatus for manufacturing a granulated body made by granulating powder and a liquid component.

2. Description of Related Art

Figure 1:
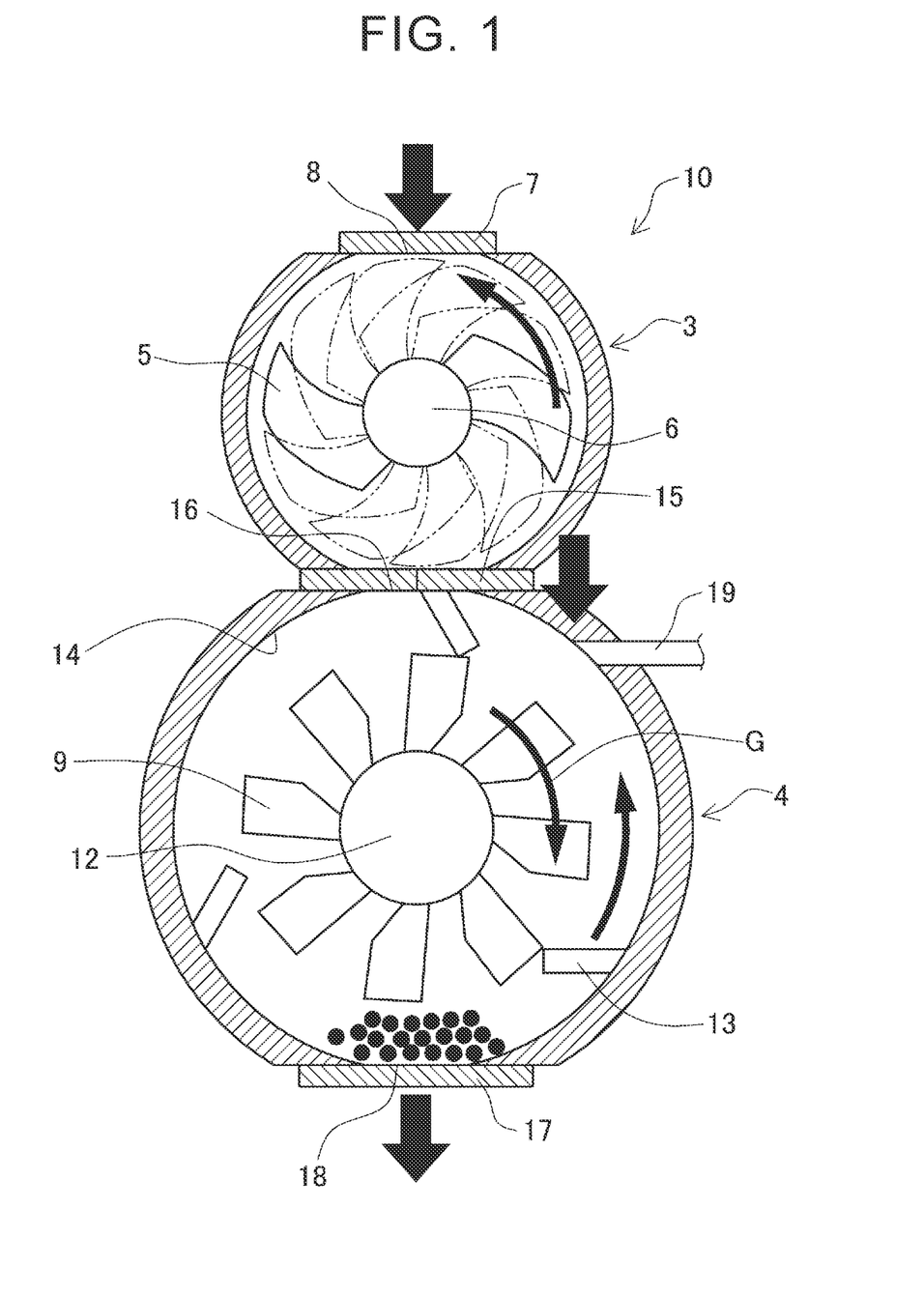
FIG. 1 is a sectional view of a manufacturing apparatus for a granulated body according to an embodiment.

A granulated body in a granulated state is made by mixing powder and a liquid component with a compounding ratio in which the liquid component is less than that in what is known as paste. A technology described in Japanese Unexamined Patent Application Publication No. 2017-104784 (JP 2017-104784 A) is an example. With the technology described in the literature, as shown in FIG. 1, a "dry mixer 1" and a "wet mixer 2" are used. In the "dry mixer 1", powder is agitated and mixed without a liquid component, and then agitated with a solvent in the "wet mixer 2". Thus, a granulated body is obtained. The granulated body is formed into a "granulated body sheet 35" by an "A roll 41" and a "B roll 42".

SUMMARY

However, in the related art, there is a following problem: powder leaks when the powder is transferred from the "dry mixer 1" to the "wet mixer 2". Therefore, a solid content ratio in a completed granulated body becomes slightly lower than a target ratio. Of course, it is possible to adjust the solid content ratio appropriately by reducing supply of the liquid component to the "wet mixer 2" by an amount of the powder leaked. However, this still results in a lower yield. The leakage of the powder happens while the powder is transferred because airflow is generated against a flow of the powder when the powder is transferred. This is because, as the powder enters the "wet mixer 2", air is pushed out from the "wet mixer 2".

The disclosure provides a manufacturing method and a manufacturing apparatus for a granulated body, the manufacturing method and the manufacturing apparatus restrain powder leakage when the powder is transferred from a dry agitator to a wet agitator.

A manufacturing method for a granulated body according to a first aspect of the disclosure includes supplying powder that is agitated in a dry agitator to a wet agitator, and agitating the powder supplied from the dry agitator with a liquid component in the wet agitator by rotation of blades so as to form a granulated body. The blades are rotated when the powder is supplied to the wet agitator from the dry agitator, the dry agitator agitates the powder in a dry state, and the wet agitator is positioned perpendicularly below the dry agitator. The wet agitator includes an agitation chamber and the blades that rotate inside the agitation chamber around a center axis orthogonal to a direction in which the powder is supplied. The blades include a first blade in a region on a first end portion side of the agitation chamber, and a second blade in a region on a second end portion side of the agitation chamber, the second end portion side being positioned across the agitation chamber from the first end portion side in a direction along the center axis. A first surface of the first blade becomes a front side as the first blade rotates around the center axis the first surface includes a first inclined surface directed towards the first end portion side from the second end portion side, and a second surface of the second blade becomes a front side as the second blade rotates around the center axis the second surface includes a second inclined surface directed towards the second end portion side from the first end portion side.

In the manufacturing method for the granulated body according to the aspect, the granulated body is manufactured in the dry agitation process in which powder is agitated in the dry agitator in a dry state, and thereafter in the wet agitation process in which the powder is agitated with the liquid component in the wet agitator by rotation of the blades. Between the dry agitation process and the wet agitation process, a transfer process is carried out. In the transfer process, the powder after the dry agitation process is supplied to the wet agitator that is disposed perpendicularly below the dry agitator. The blades are also rotated in the transfer process. Therefore, due to an action of the inclined surfaces on the front sides of the blades, airflow is generated in a direction from the first end portion side to the second end portion side, and in a direction from the second end portion side to the first end portion side. Therefore, due to suction by the airflow in the direction from the first end portion side to the second end portion side and in the direction from the second end portion side to the first end portion side, blowing-back of air from the wet agitator towards the dry agitator is reduced. Thus, leakage of the powder is reduced. The term "orthogonal" herein means not only "orthogonal" in a strict sense but also "orthogonal" within a range of common technical knowledge.

In the manufacturing method for the granulated body according to the first aspect, the agitation chamber may have a cylindrical shape, and the center axis may be parallel to the horizontal direction and coincide with a center axis of the cylindrical shape.

In the manufacturing method for the granulated body according to the first aspect, the agitation chamber may include a surface in the region on the first end portion side and a surface in the region on the second end portion side. a first exhaust port is provided in the surface in the region on the first end portion side, and a second exhaust port is provided in the surface in the region on the second end portion side. The first and second exhaust ports function as exits for the airflow. Therefore, blowing-back of air from the wet agitator to the dry agitator is reduced more favorably, and leakage of the powder is reduced further.

In the manufacturing method for the granulated body according to the first aspect, rotational speed of the blades may be 100 rpm or lower, or may even be 60 rpm or lower when the powder is supplied form the dry agitator. When the rotational speed is too high, airflow is generated in a centrifugal direction inside the wet agitator, and an effect of the airflow generated by the inclined surfaces is canceled.

In the manufacturing method for the granulated body according to the first aspect, a first transfer port may be open in a side surface of the dry agitator, a second transfer port may be open in a side surface of the wet agitator, and the first transfer port and the second transfer port may communicate with each other. A shutter may be provided between the side surface of the dry agitator and the side surface of wet agitator. The shutter may open and close the first transfer port and the second transfer port. The blades may be rotated when the shutter is closed A manufacturing apparatus for a granulated body according to a second aspect of the disclosure includes a dry agitator configured to agitate powder in a dry state, and a wet agitator that is positioned perpendicularly below the dry agitator and configured to agitate the powder with a liquid component. The wet agitator includes an agitation chamber and blades configured to rotate around a center axis that is parallel to a horizontal direction inside the agitation chamber, and the blades include a first blade in a region on a first end portion side of the agitation chamber, and a second blade in a region on a second end portion side of the agitation chamber, the second end portion side being positioned across the agitation chamber from the first end portion side in a direction along the center axis. A first surface of the first blade becomes a front side as the first blade rotates around the center axis, the first surface includes a first inclined surface configured to direct towards the first end portion side from the second end portion side, and a second surface of the second blade becomes a front side as the second blade rotates around the center axis, the second surface includes a second inclined surface configured to direct towards the second end portion side from the first end portion side. With the manufacturing apparatus, it is possible to carry out the manufacturing method for the granulated body according to the first aspect. The term "horizontal" herein means not only "horizontal" in a strict sense, but also "horizontal" within a range of common technical knowledge.

In the manufacturing apparatus for the granulated body according to the second aspect, the agitation chamber may have a cylindrical shape, and the center axis may coincide with a center axis of the cylindrical shape.

In the manufacturing apparatus for the granulated body according to the second aspect, an angle of inclination of the first inclined surface from a vertical plane with respect to the center axis may be in a range from 30° to 60°, and an angle of inclination of the second inclined surface from the vertical plane with respect to the center axis may be in the range from 30° to 60°. When the angles of inclination of the first inclined surfaces are within the range, airflow is generated by the first inclined surfaces efficiently in a direction from the second end portion side to the first end portion side when the blades are rotated. When the angles of inclination of the second inclined surfaces are within the range, airflow is generated by the second inclined surfaces efficiently in a direction from the first end portion side to the second end portion side when the blades are rotated.

In the manufacturing apparatus for the granulated body according to the aspect, the agitation chamber may include a surface in the region on the first end portion side and a surface in the region on the second end portion side. A first exhaust port may be provided in the surface in the region on the first end portion side, and a second exhaust port may be provided in the surface in the region on the second end portion side. This is because the exhaust ports function as exits for the airflows.

The manufacturing apparatus for the granulated body according to the second aspect may include a rotation control part configured to rotate the blades when the powder is supplied to the wet agitator from the dry agitator and when the wet agitator agitates the powder supplied from the dry agitator with the liquid component so as to form the granulated body. Thus, it is possible to carry out the manufacturing method for the granulated body automatically.

In the manufacturing apparatus for the granulated body according to the second aspect, a first transfer port may be open in a side surface of the dry agitator, and a second transfer port may be open in a side surface of the wet agitator. Further, a shutter may be provided between the side surface of the dry agitator and the side surface of the wet agitator. The shutter may be configured to open and close the first transfer port and the second transfer port. The manufacturing apparatus may include a rotation control part configured to rotate the blades when the shutter is closed.

The first exhaust port may be positioned within a range of a circle defined by the cylindrical shape on the surface in the region on the first end portion side, the range excluding 20% on a lower side in a vertical upper-lower direction, and also within a range of the circle excluding 20% on an upper side in the vertical upper-lower direction. The second exhaust port may be positioned within a range of the circle on the surface in the region on the second end portion side, the range excluding 20% on a lower side in the vertical upper-lower direction, and also within a range of the circle excluding 20% on an upper side in the vertical upper-lower direction.

With the configuration, the manufacturing method and the manufacturing apparatus for the granulated body are provided, the manufacturing method and the manufacturing apparatus restraining powder leakage when the powder is transferred from the dry agitator to the wet agitator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 2:
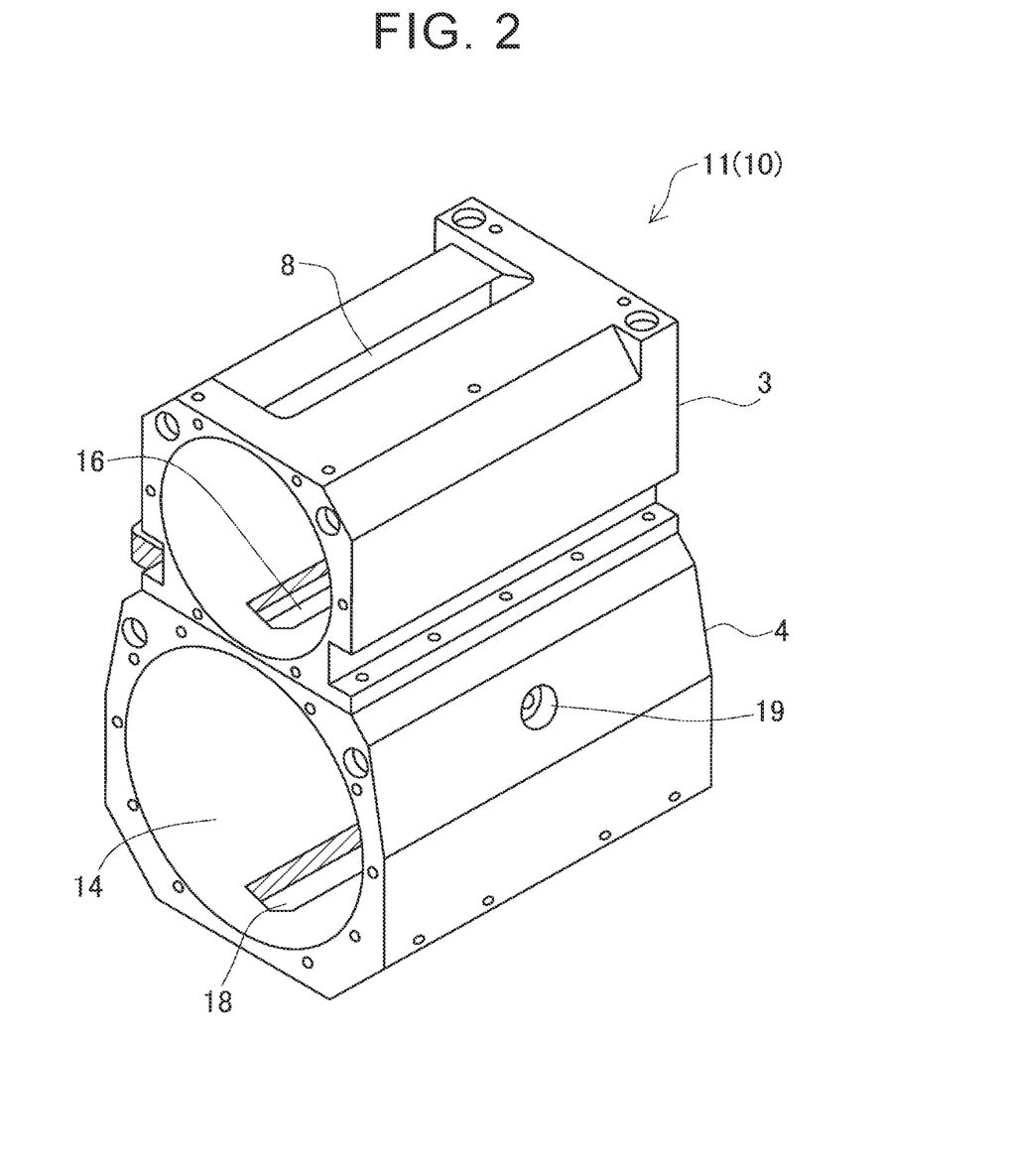
FIG. 2 is a perspective view of the manufacturing apparatus shown in FIG. 1 without internal components.

Hereinafter, an embodiment that embodies the disclosure is described in detail with reference to the attached drawings. In the embodiment, the disclosure is embodied as an apparatus and a method suitable for manufacturing a granulated body of active material powder in order to form an electrode active material layer in a battery manufacturing process. A manufacturing apparatus 10 for the granulated body according to the embodiment is roughly configured as shown in FIG. 1 and FIG. 2. As shown in the sectional view in FIG. 1, the manufacturing apparatus 10 includes a dry agitator 3 on an upper side and a wet agitator 4 on a lower side. Further, as seen in a perspective view of a structure 11 of the manufacturing apparatus 10 shown in FIG. 2, both the dry agitator 3 and the wet agitator 4 have a cylindrical shape and are arranged so that the axis directions of the dry agitator 3 and the wet agitator 4 become horizontal.

As shown in FIG. 1, dispersion blades 5 are provided inside the dry agitator 3. The dispersion blades 5 are mounted on a rotary shaft 6. As the rotary shaft 6 rotates, the dispersion blades 5 rotate inside the dry agitator 3. The rotary shaft 6 is provided along a center axis of the cylindrical shape of the dry agitator 3. Further, a shutter 7 is provided in an upper side of the dry agitator 3. In an upper part of the dry agitator 3, a feed port 8 is open, and the shutter 7 opens and closes the feed port 8.

Rotating blades are also provided inside the wet agitator 4. The blades in the wet agitator 4 are referred to as cutting blades 9. The cutting blades 9 are also mounted on a rotary shaft 12 and configured to rotate as the rotary shaft 12 rotates. The rotary shaft 12 serves as a center axis orthogonal to a direction in which the powder is supplied, and is provided along a center axis of the cylindrical shape of the wet agitator 4. Also, inside the wet agitator 4, an agitating blade 13 is provided in addition to the cutting blades 9. Although the agitating blade 13 also rotates axially inside the wet agitator 4, the agitating blade 13 is arranged so as to be separated from the rotary shaft 12 and rotate along an inner wall 14 of the wet agitator 4. The cutting blades 9 rotate in a direction opposite to a direction in which the agitating blade 13 rotates.

In the foregoing configuration, the rotary shaft 6 and the rotary shaft 12 receive rotary drive separately from an outside of the structure 11. Further, the agitating blade 13 rotates due to drive from the outside of the structure 11, the drive being separate from that for the rotary shaft 12. Illustration and description of the drive of the agitating blade 13 is omitted. A shutter 15 is provided between the dry agitator 3 and the wet agitator 4. An open transfer port 16 is formed between the dry agitator 3 and the wet agitator 4, and the shutter 15 opens and closes the transfer port 16. In other words, a first transfer port is open in a side surface of the dry agitator 3, and a second transfer port is open in a side surface of the wet agitator 4. The shutter 15 is positioned between the side surface where the first transfer port is located, and the side surface where the second transfer port is located, and is configured to open and close the first transfer port and the second transfer port. Further, on a lower side of the wet agitator 4, a shutter 17 is provided. In a lower portion of the wet agitator 4, a discharge port 18 is formed so as to open, and the shutter 17 opens and closes the discharge port 18.

In the wet agitator 4, a liquid discharge nozzle 19 is also provided. Meanwhile, no liquid discharge nozzle is provided in the dry agitator 3. FIG. 2 shows only the structure 11 that is the manufacturing apparatus 10 without internal components (the rotary shaft 6, the dispersion blades 5, the rotary shaft 12, the cutting blades 9, and the agitating blade 13) of the dry agitator 3 and the wet agitator 4.

Figure 3:
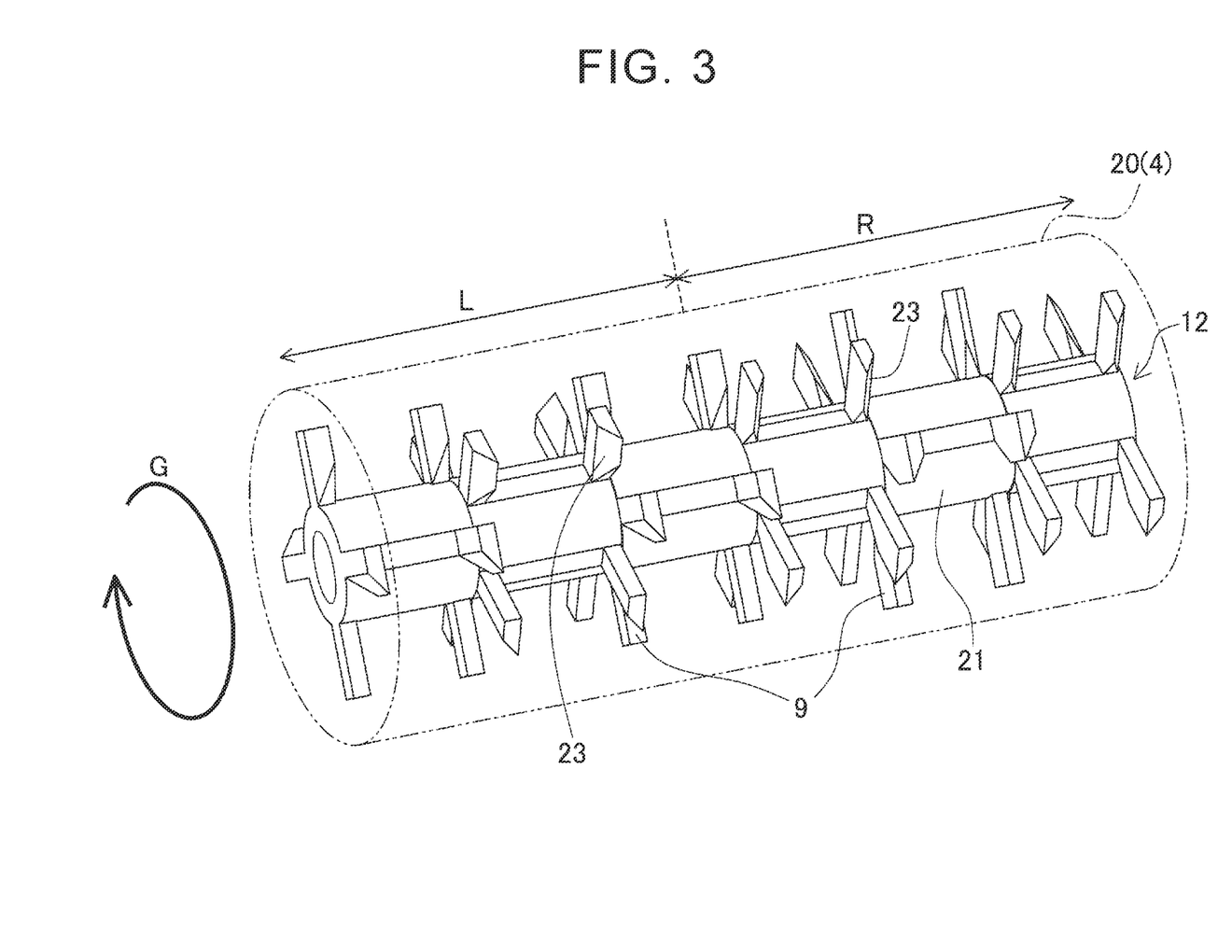
FIG. 3 is a perspective view of cutting blades and a rotary shaft provided in a wet agitator.

The cutting blades 9 of the wet agitator 4 are described further in detail. As shown in FIG. 3, the cutting blades 9 are distributed over the entire length of the rotary shaft 12. This means that the cutting blades 9 are provided in both a region L on one end portion side (a first end portion side) and a region R on the other end portion side (a second end portion side) in a center axis direction of an agitation chamber 20 that is a cylindrical internal space of the wet agitator 4. The rotary shaft 12 in which a number of the cutting blades 9 shown in FIG. 3 are provided has a section unit configuration. This means that the rotary shaft 12 is configured by connecting a plurality of rotary shaft elements 21 shown in FIG. 4 in a longitudinal direction. In the rotary shaft 12 shown in FIG. 3, each of the regions L, R is made of three of the rotary shaft elements 21. In the rotary shaft element 21 shown in FIG. 4, the eight cutting blades 9 are formed.

Figure 4:
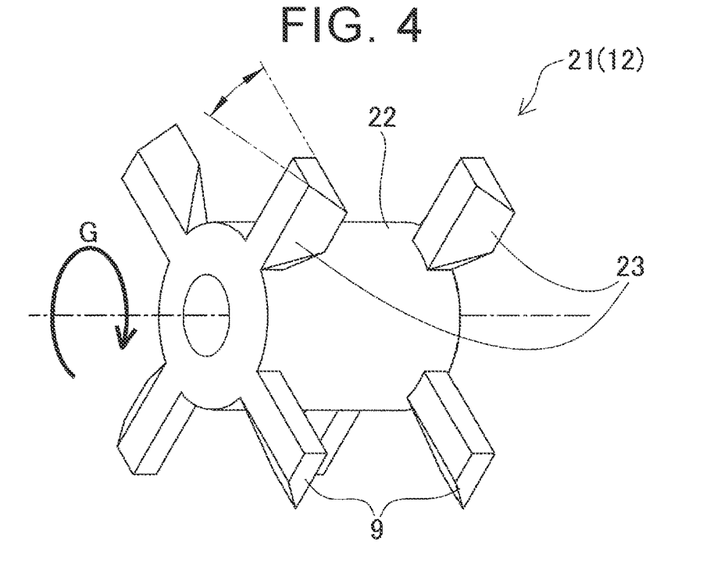
FIG. 4 is a perspective view of a unit element of the rotary shaft shown in FIG. 3 in a longitudinal direction.
Figure 5:
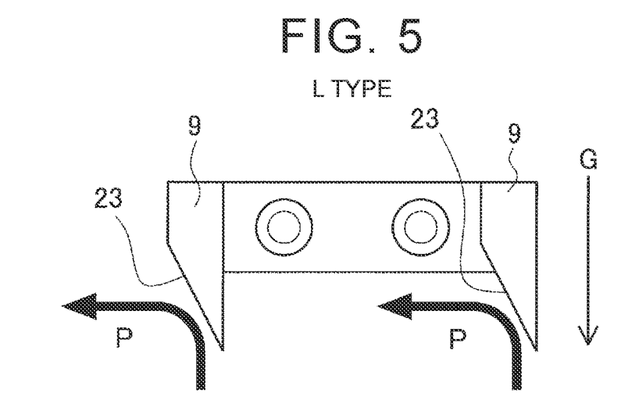
FIG. 5 is a front view (1) of the cutting blades seen from a radial direction of the rotary shaft.
Figure 6:
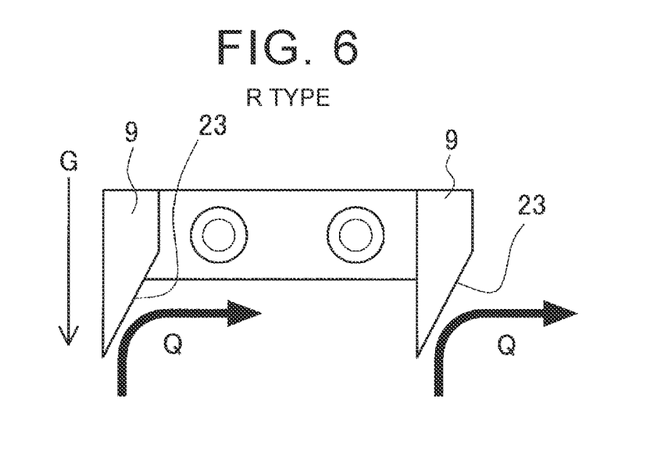
FIG. 6 is a front view (2) of the cutting blades seen from the radial direction of the rotary shaft.

Each of the cutting blades 9 shown in FIG. 4 is a pillar-shaped portion that is formed so as to project radially outwardly from a shaft portion 22. However, in each of the cutting blades 9, a surface (first surface, second surface) that is on the front side at the time of rotation serves as an inclined surface 23. Further description is given with reference to FIG. 5 and FIG. 6 regarding the cutting blade 9 in which the inclined surface 23 is formed. FIG. 5 and FIG. 6 are views of the cutting blades 9 seen from top surface sides of the cutting blades 9. This means that, in the drawings, the cutting blades 9 are seen in the radial direction of the rotary shaft 12. In FIG. 5 and FIG. 6, arrows G show directions in which the cutting blades 9 advance due to rotation of the rotary shaft 12. As shown in FIG. 5 and FIG. 6, the inclined surfaces 23 are positioned on the front side when the cutting blades 9 move in the direction of arrow G.

The inclined surfaces 23 of the cutting blades 9 (first blades) in FIG. 5 and the cutting blades 9 (second blades) in FIG. 6 are inclined in the opposite directions to one another. In FIG. 5, the inclined surfaces 23 (the first inclined surfaces) are inclined to the left (a direction from the second end portion side to the first end portion side), and are referred to as an "L type". In FIG. 6, the inclined surfaces 23 (the second inclined surfaces) are inclined to the right (a direction from the first end portion side to the second end portion side), and are referred to as an "R type". In each of the rotary shaft elements 21 (see FIG. 4) shown in FIG. 3, all of the cutting blades 9 are either the "L type" or the "R type", and those of the L type and the R type are never mixed. The cutting blades 9 actually shown in FIG. 4 are the L type. In the rotary shaft 12 and the cutting blades 9 shown in FIG. 3, the region L portion is made of three of the rotary shaft elements 21 that are L-type and the region R portion is made of three of the rotary shaft elements 21 that are R-type.

Figure 7:
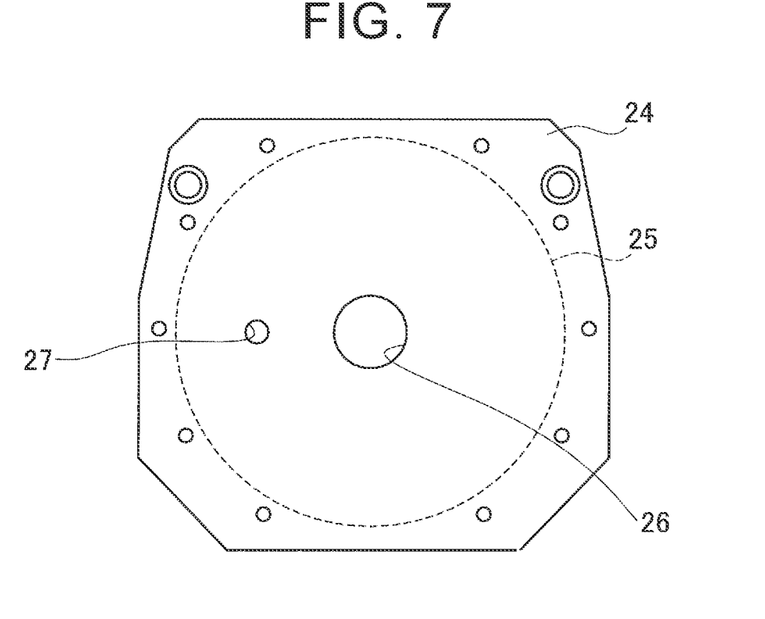
FIG. 7 is a plan view of a lid member that closes an end portion of the wet agitator.

Next, end portions of the dry agitator 3 and the wet agitator 4 are described. In the structure 11 shown in FIG. 2, the end portions of the dry agitator 3 and the wet agitator 4 are illustrated as open. However, needless to say, the end portions of the dry agitator 3 and the wet agitator 4 are closed when the manufacturing apparatus 10 is actually used. Closing of the end portion of the wet agitator 4 is described. When the wet agitator 4 is actually used, the end portion of the wet agitator 4 (the agitation chamber 20) is closed by a lid member 24 shown in FIG. 7. FIG. 7 is a view of the lid member 24 seen from an inner surface side. The upper-lower direction in FIG. 7 is the same as the upper-lower direction in FIG. 1.

A circle 25 illustrated by a broken line in the lid member 24 shown in FIG. 7 is a circle corresponding to the inner wall 14 of the wet agitator 4. A hole 26 is formed in the center of the circle 25. The hole 26 is used in order to transmit drive to the rotary shaft 12 shown in FIG. 3. The agitating blade 13 shown in FIG. 1 is also driven through the hole 26. In practice, the hole 26 is closed by drive transmission members for the rotary shaft 12 and agitating blade 13, and is thus in an airtight state. Inside the circle 25 of the lid member 24, an exhaust port 27 is formed. Even in a state where the end portions of the agitation chamber 20 are closed by the lid members 24, respectively, air is able to move between an inside and an outside of the agitation chamber 20 through the exhaust port 27. The exhaust port 27 is positioned at a height of almost the middle of the circle 25 in the upper-lower direction. Further, the exhaust port 27 is provided at a position separated from the hole 26. As a matter of course, both end portions of the agitation chamber 20 are closed by the lid members 24, respectively.

Although not illustrated, the end portions of the dry agitator 3 are closed by lid members (not shown) almost same as the lid member 24 shown in FIG. 7, respectively. However, needless to say, the lid members for the dry agitator 3 have a size that fits the dry agitator 3. In each of the lid members for the dry agitator 3, it is not necessary to form an exhaust port equivalent to the exhaust port 27.

Figure 8:
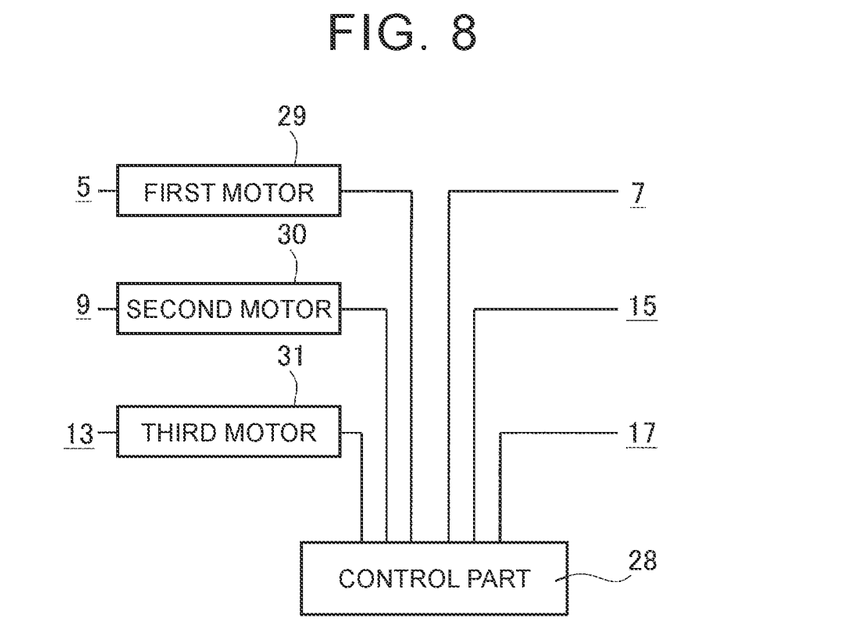
FIG. 8 is a block diagram showing a configuration of a control system of the manufacturing apparatus shown in FIG. 1.

FIG. 8 shows a configuration of a control system of the manufacturing apparatus 10 according to the embodiment. As shown in FIG. 8, the control system is configured around a control part 28. A first motor 29, a second motor 30, a third motor 31, and the shutters 7, 15, 17 are connected with the control part 28. The first motor 29 is a driving source for the dispersion blades 5 of the dry agitator 3. The second motor 30 is a driving source for the cutting blades 9 and the rotary shaft 12 shown in FIG. 3. The third motor 31 is a driving source for the wet agitator 4 and the agitating blade 13. The shutters 7, 15, 17 are those described earlier. Thus, each part of the manufacturing apparatus 10 is controlled and operated appropriately. The content of the control is described in detail later. Regarding the shutters 7, 15, 17, a solenoid or an actuator such as hydro-pneumatic equipment is actually interposed between each of the shutters 7, 15, 17 and the control part 28.

Next, a manufacturing method for a granulated body using the manufacturing apparatus 10 having the foregoing configuration is described. The manufacturing method for the granulated body according to the embodiment is carried out by two stages of agitation that are dry agitation as the first stage and wet agitation thereafter. As a matter of course, the dry agitation is carried out in the dry agitator 3, and the wet agitation is carried out in the wet agitator 4.

The dry agitation in the dry agitator 3 is done only with powder components that are an electrode active material and additives (a conductive material, a binding material, and so on). This means that, in this stage, no liquid component (solvent) is used. This is the meaning of "dry". In the dry agitation, first, the shutter 15 is closed and the shutter 7 is open, and then powder as a raw material is fed into the dry agitator 3 from the feed port 8. Then, the shutter 7 is closed and the dispersion blades 5 are rotated by the first motor 29. This is the dry agitation. A part of the base powder fed into the dry agitator 3 is sometimes solidified in an aggregated state. The dry agitation loosens the base powder, and even if a part of the base powder is in the aggregated state, the part is broken up.

Once the dry agitation is finished, the wet agitation is carried out next. Therefore, the shutter 17 is closed and the shutter 15 is opened. Thus, the agitated base powder inside the dry agitator 3 is supplied to the wet agitator 4 through the transfer port 16. As the transfer port 16 opens, the base powder naturally moves due to its own weight. This is the transfer.

Then, the shutter 15 is closed again, and the second motor 30 and the third motor 31 rotate the cutting blades 9 and the agitating blade 13, respectively. At this time, a solvent is supplied to the wet agitator 4 from the liquid discharge nozzle 19. As described above, using not only the powder components but also the liquid component is the meaning of "wet". Inside the agitation chamber 20 of the wet agitator 4, the supplied base powder and solvent are agitated by the cutting blades 9 and the agitating blade 13, and form the granulated body. The granulated body is made of the powder and the solvent that are in the granulated state together, and is particles that are way finer than those of the powder in the aggregated state before the dry agitation.

During the wet agitation, the cutting blades 9 and the agitating blade 13 have their own roles. The role of the cutting blades 9 is to cut and micronize particles that are made by the base powder being entangled with the solvent. The role of the agitating blade 13 is to scoop up the base powder and the solvent accumulated near a bottom portion inside the agitation chamber 20 so as to make them agitated. As the shutter 17 opens, the manufactured granulated body is discharged downwardly from the discharge port 18 by its own weight. By disposing equipment for the next process in the shutter 17 shown in FIG. 1, the manufactured granulated body is supplied to the next process. An example of the equipment for the next process includes a sheet forming device like "41" and "42" in FIG. 1 of JP 2017-104784 A. Alternatively, the sheet may be formed on a conductive foil. The dry agitation for the next lot may start in the dry agitator 3 without waiting for the end of the wet agitation in the wet agitator 4. Operations of the first motor 29, the second motor 30, the third motor 31, and the shutters 7, 15, 17 in each of the processes are instructed by the control part 28 shown in FIG. 8.

A characteristic of the embodiment is in the stage of the transfer from the dry agitator 3 to the wet agitator 4. In the embodiment, the cutting blades 9 (the second motor 30) are already rotating at the point when the transfer is happening before the wet agitation starts. The purpose of this is to restrain leakage of the base powder at the time of the transfer. If the transfer is carried out without rotating the cutting blades 9, leakage happens with the reasons described in the "Summary". However, in the embodiment, because the cutting blades 9 are operated during the transfer, leakage is restrained.

Described below are the reasons why leakage is restrained by rotation of the cutting blades 9 in the embodiment. As describe in FIG. 5 and FIG. 6, the inclined surfaces 23 are formed in the cutting blades 9. Then, the inclined surfaces 23 face outside with respect to the axis direction in each of the regions L, R. Therefore, as the inclined surfaces 23 advance due to rotation of the cutting blades 9 (the rotary shaft 12) (arrows G in FIG. 5 and FIG. 6), air inside the agitation chamber 20 is pushed outwardly with respect to the axis direction due to inclination of the inclined surfaces 23 (arrows P, Q in FIG. 5 and FIG. 6). Thus, in the entire agitation chamber 20, airflow from the center to both ends in the axis direction is formed. In this state, the transfer of the base powder is carried out.

Figure 9:
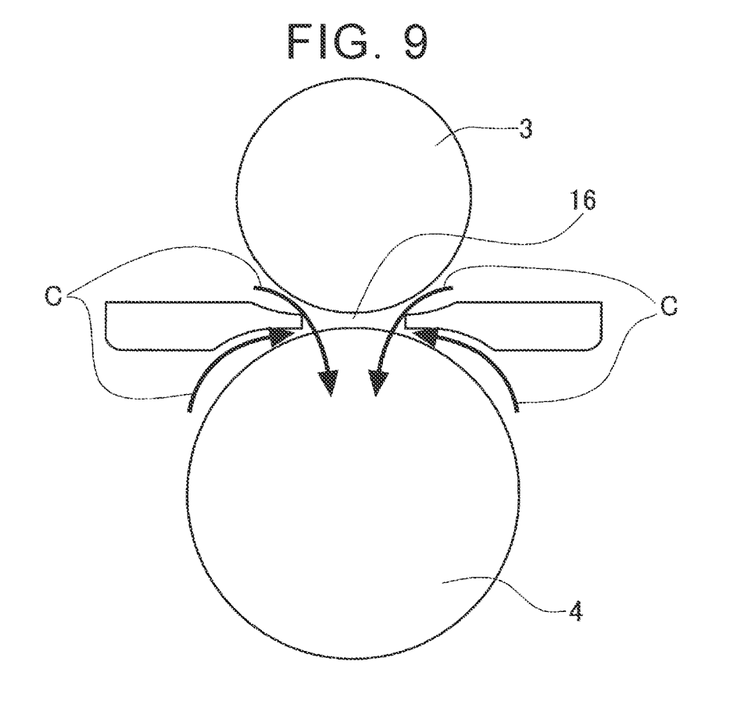
FIG. 9 is a schematic view of suction airflow when powder is transferred while the cutting blades are rotated.
Figure 10:
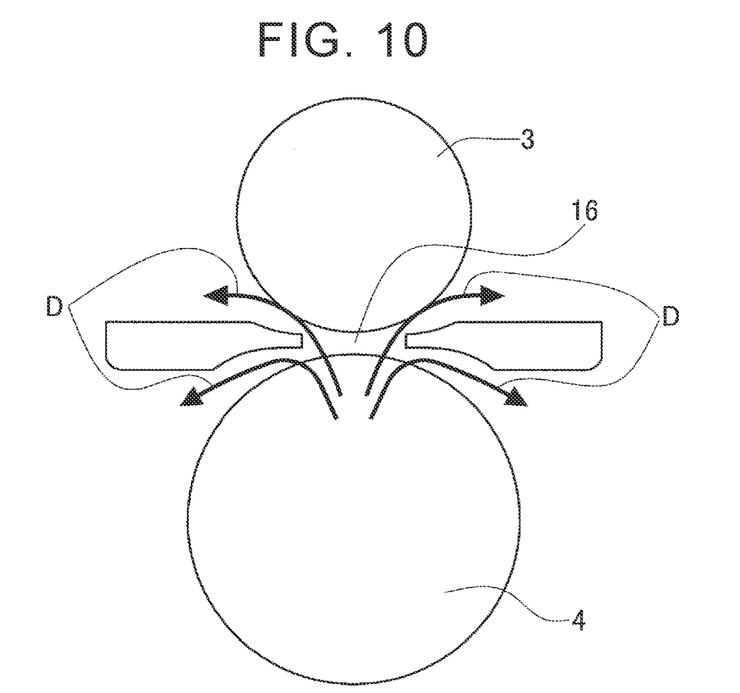
FIG. 10 is a schematic view of blowing-back airflow when powder is transferred without rotation of the cutting blades.

Therefore, the airflow P, Q restrains air from blowing back to the dry agitator 3 from the wet agitator 4. This means that, by opening the transfer port 16 while rotating the cutting blades 9, airflow shown by arrows C in FIG. 9 is generated near the transfer port 16. To be specific, since the airflow P, Q sucks in air in the periphery due to the Bernoulli's principle, air tends to be sucked in the wet agitator 4 from the dry agitator 3. If the transfer is carried out without rotation of the cutting blades 9, airflow that pushes out air is generated as shown by arrows D in FIG. 10 as the base powder is transferred. In FIG. 9, the airflow P, Q cancels the pushing-out airflow D and generates the suction airflow C. As a result, in FIG. 9, leakage of the base powder at the time of transfer is restrained.

Further, as described in FIG. 7, the exhaust port 27 is formed in the lid member 24 in each of the end portions of the agitation chamber 20. In other words, there is the first exhaust port in a surface of the first end portion of the agitation chamber in the center axis direction, and there is the second exhaust port in a surface of the second end portion of the agitation chamber in the center axis direction. The exhaust ports 27 also contribute to restraint of the base powder leakage because air that reaches the end portions of the agitation chamber 20 due to the airflow P, Q is able to escape outside from the exhaust ports 27. Leakage of the base powder from the exhaust ports 27 hardly happens, because the exhaust ports 27 are provided at positions described earlier.

A position near the bottom portion of the agitation chamber 20 is where the base powder transferred from the dry agitator 3 is accumulated. Therefore, it is preferred that each of the exhaust ports 27 is provided at a position in the circle 25 in FIG. 7 within a range that excludes a range of 20% on a lower side in the upper-lower direction. Further, a position near a top portion of the agitation chamber 20 is extremely close to the transfer port 16 disposed between the wet agitator 4 and the dry agitator 3. Specifically, the position is close to a falling path of the base powder immediately after the base powder passes the transfer port 16. Therefore, it is more preferred that the exhaust port 27 is provided at a position in the circle 25 within a range that also excludes a range of 20% on an upper side in the upper-lower direction. In the embodiment, the exhaust port 27 is provided at a position within the range that satisfies the above.

The agitating blade 13 may or may not be rotated at the transfer stage. The airflow P, Q caused by the inclined surfaces 23 is generated not only in the transfer stage, but also during the wet agitation. However, the airflow P, Q does not particularly mean anything at the time of the wet agitation.

Described below are results of tests carried out by the inventors. The tests described here were carried out in order to verify that rotation of the cutting blades 9 at the time of the transfer is effective for leakage prevention. In the tests, the following was used as an example of the base powder for a negative electrode material for a lithium ion secondary battery.

Active material: natural graphite
Conductive material: (not used)
Binding material: carboxymethyl cellulose
Composition ratio: an active material: an binding material=99:1 (weight ratio)

Figure 11:
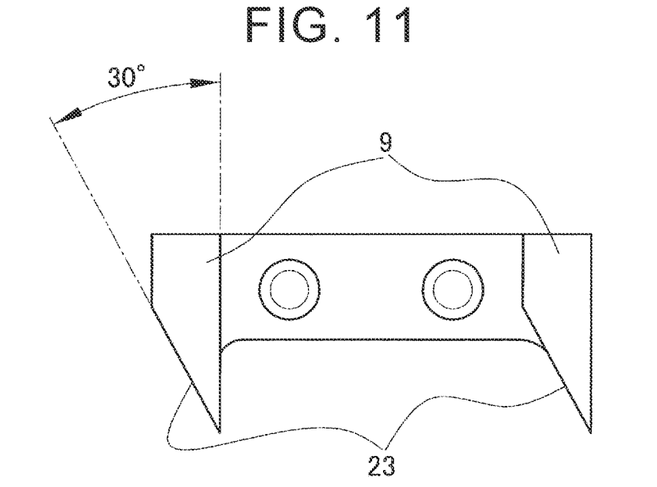
FIG. 11 is a front view of the cutting blades having inclined surfaces with an elevation angle of 30°.
Figure 12:
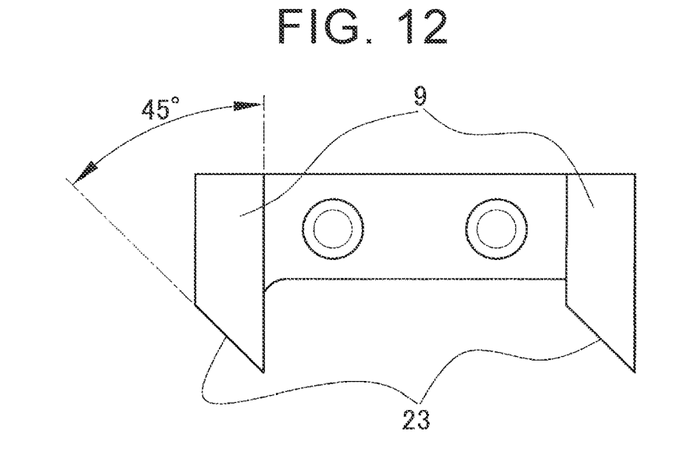
FIG. 12 is a front view of the cutting blades having the inclined surfaces with an elevation angle of 45°.
Figure 13:
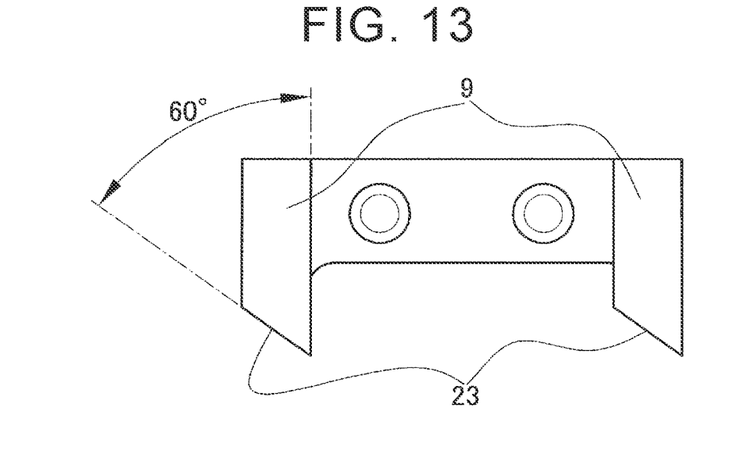
FIG. 13 is a front view of the cutting blades having the inclined surfaces with an elevation angle of 60°.

Further, an elevation angle of the inclined surface 23 of each of the cutting blades 9 (an angle of the inclined surface 23 with respect to the advancing direction G in FIG. 5 and FIG. 6) was in three levels that are 30° (FIG. 11), 45° (FIG. 12), 60° (FIG. 13). Regarding the direction of inclination of the inclined surfaces 23, FIG. 11, FIG. 12, and FIG. 13 only show the L type. However, needless to say, there are three-level elevation angles in the R type as well. Further, as a comparative example, the cutting blades 9 with an elevation angle of 90°, in other words, the cutting blades 9 without inclined distal end surface were also prepared. The entire cutting blades 9 in one rotary shaft 12 had the same angle of inclination (however, as described earlier, the directions of inclination were different between the regions L, R except the case where the angle is 90°).

Conditions of the dry agitation were set as follows.
Rotational speed of the dispersion blades 5: 1000 rpm
Rotation time of the dispersion blades 5: 20 seconds
Conditions for the transfer operation were set as follows:
Opening time of the shutter 15: 8 seconds
Rotational speed of the cutting blades 9: three levels of 0 rpm (stop), 60 rpm, and 100 rpm
Rotation of the agitating blade 13: 0 rpm (stop)

Figure 14:
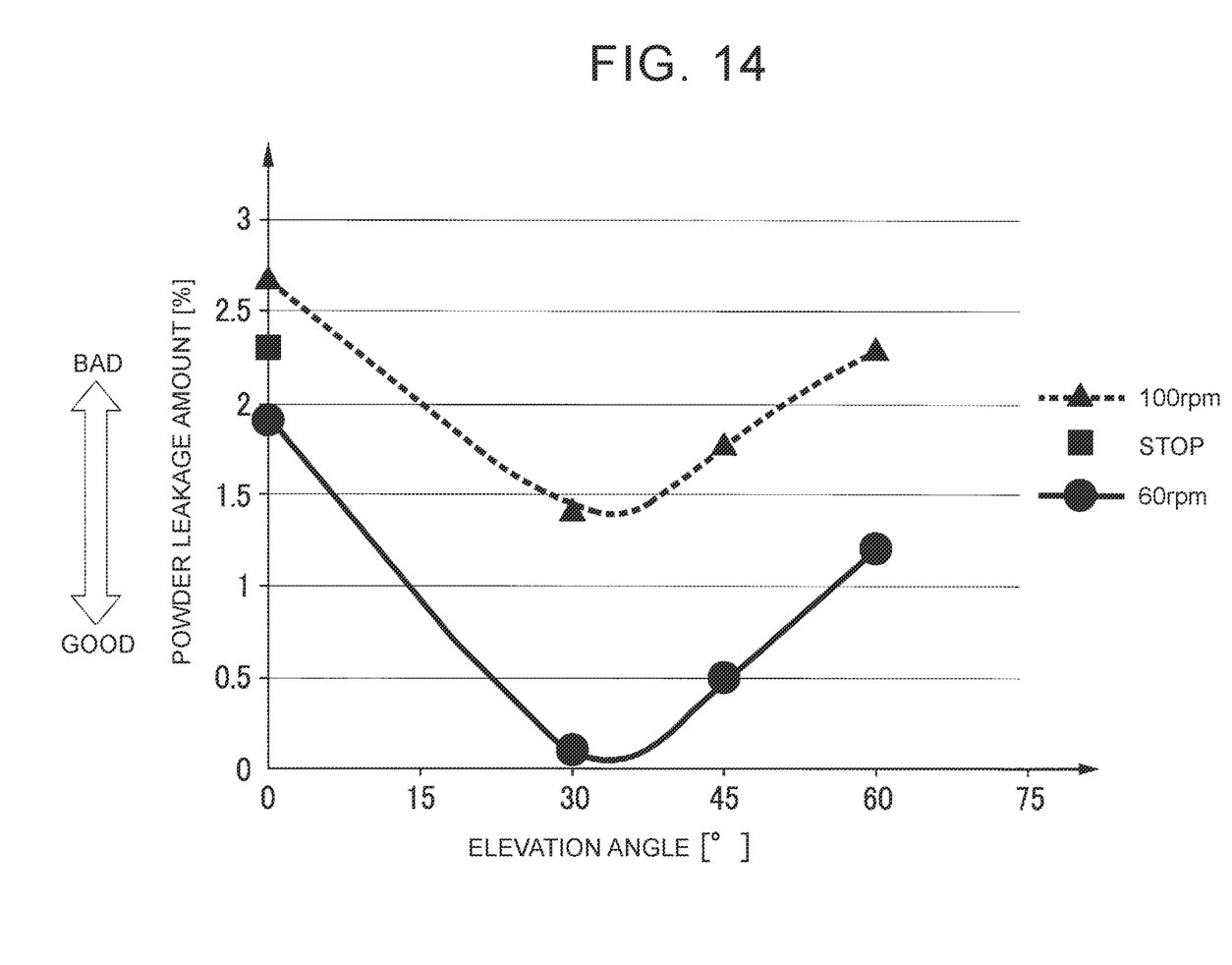
FIG. 14 is a graph showing test results of powder leakage amounts.

Under these conditions, an amount of powder leakage was calculated based on a weight ratio between a feed amount of the base powder to the dry agitator 3 and an amount of the base powder in the wet agitator 4 after the transfer operation is ended. The results are shown in Table 1. In Table 1, values in Italic in the columns "rotational speed of cutting blades" and "elevation angle" mean they do not meet the conditions of the disclosure, and that is why they are stated as comparative examples instead of examples. The results are plotted as a graph shown in FIG. 14.

TABLE 1

|  | Rotational Speed of Cutting Blades | Elevation Angle | Powder Leakage Amount |
|---|---|---|---|
| Comparative Example 1 | 0 rpm (Stop) | 90° | 2.3% |
| Comparative Example 2 | 60 rpm |  | 1.9% |
| Example 1 |  | 30° | 0.1% |
| Example 2 |  | 45° | 0.5% |
| Example 3 |  | 60° | 1.2% |
| Comparative Example 3 | 100 rpm | 90° | 2.7% |
| Example 4 |  | 30° | 1.44% |
| Example 5 |  | 45° | 1.78% |
| Example 6 |  | 60° | 2.3% |

"Comparative Example 1" in Table 1 is a comparative example in which the transfer was carried out without rotating the cutting blades 9. As the comparative example in which the rotation is stopped, the test was carried out only for the cutting blades 9 with the elevation angle of 90°. In the comparative example, an amount of powder leakage was 2.3% that is not a negligible amount.

"Comparative Example 2", "Example 1", "Example 2", and "Example 3" are test examples where rotational speed of the cutting blades 9 was 60 rpm. When the four test examples are compared to each other, in any of "Example 1", "Example 2", and "Example 3" in which elevation angles are provided, an amount of powder leakage is less than that of "Comparative Example 2" where the elevation angle is 90°. In particular, in "Example 1" with the elevation angle of 30°, and "Example 2" with the elevation angle of 45°, the amounts of powder leakage are extremely small.

"Comparative Example 3", "Example 4", "Example 5", and "Example 6" are the test examples where rotational speed of the cutting blades 9 was 100 rpm. When the four test examples are compared to each other, almost the same trend is observed as that of the case with the rotational speed of 60 rpm. Thus, in any of "Example 4", "Example 5", and "Example 6" in which elevation angles are provided, an amount of powder leakage is smaller than that of "Comparative Example 3" with the elevation angle of 90°. In "Example 4" with the elevation angle of 30° and "Example 5" with the elevation angle of 45°, the amounts of powder leakage are far smaller than that of "Comparative Example 3".

Looking through "Example 1", "Example 2", and "Example 3", and "Example 4", "Example 5", and "Example 6", in any of these examples, the amount of powder leakage is smaller than that of the comparative examples with the same rotational speed of the cutting blades 9. Also, when the examples with the same rotational speed of the cutting blades 9 are compared to each other, the smaller the elevation angle is, the smaller the amount of powder leakage becomes. The reason why a smaller elevation angle produces a more excellent result is considered to be that the inclined surface 23 becomes wider and generates larger force for pushing air towards the end portions.

Further, compared to the case where the rotational speed of the cutting blades 9 is 100 rpm, the result is more excellent when the rotational speed of the cutting blades 9 is 60 rpm that is slightly slower than the fast speed of 100 rpm. When the rotational speed of the cutting blades 9 is too fast, the effect of the disclosure tends to be reduced. The reason is considered to be that rotation of the cutting blades 9 itself generates airflow in a centrifugal direction to some extent when the rotational speed of the cutting blades 9 is too high. However, at 100 rpm, the effect is still recognized even in the case of the most unfavorable "Example 6" in comparison with "Comparative Example 3", and the result is still better than "Comparative Example 1".

Accordingly, it is understood that the effect of the disclosure is obtained within a range of the elevation angle of the inclined surface 23 from 30° to 60°. In particular, it is more preferable when the elevation angle is within a range from 30° to 45°. Also, it is understood that the effect of the disclosure is obtained when the rotational speed of the cutting blades 9 is at least within a range not exceeding 100 rpm, and the range not exceeding 60 rpm is more favorable.

As described so far, according to the embodiment, it is possible transfer the base powder from the dry agitator 3 to the wet agitator 4 while restraining leakage of the base powder. Therefore, it is possible to manufacture the granulated body favorably while the liquid discharge nozzle 19 adjusts a supply of the solvent to the wet agitator 4 to a target amount. For example, when the type of the base powder is the one described above, it is considered that water is used as the solvent, and the amount of the base powder to be supplied is equivalent to a solid content ratio of 73% by weight.

As described so far in detail, according to the embodiment, the dry agitator 3 and the wet agitator 4 are provided, and the granulated body is manufactured by the wet agitation after the dry agitation. In the manufacturing of the granulated body, when the base powder is transferred from the dry agitator 3 to the wet agitator 4, the airflow P, Q towards the end portions is generated inside the wet agitator 4. Thus, at the time of the transfer, air is restrained from blowing back to the dry agitator 3 from the wet agitator 4, thereby reducing leakage of the base powder. In this way, the manufacturing apparatus 10 and the manufacturing method for the granulated body are realized, the manufacturing apparatus 10 and the manufacturing method enabling the granulated body having a targeted solid content ratio to be obtained in a favorable fashion.

The embodiment is only an example and does not limit the disclosure at all. Therefore, it is naturally possible to make various improvements and deformations in the disclosure without departing from the gist of the disclosure. For example, the specific configuration of the dry agitator 3 is optional, and the dry agitation may be carried out with a different configuration from the dispersion blades 5. Further, the agitating blade 13 in the wet agitator 4 is not essential. When a clearance between distal ends of the cutting blades 9 and the inner wall 14 of the agitation chamber 20 is small enough, the base powder may hardly accumulate at the bottom portion of the agitation chamber 20 even when the agitating blade 13 is not provided. Further, the cutting blades 9 are not limited to those provided outwardly from the rotary shaft 12, and may be provided inwardly from a member that rotationally moves along the inner wall 14 of the agitation chamber 20. Also, the total number of the cutting blades 9 is not particularly limited.

The rotary shaft 12 and the cutting blades 9 shown in FIG. 3 may not have a configuration that is made of pieces of the rotary shaft elements 21 shown in FIG. 4. The cutting blades 9 may be mounted on the integral rotary shaft 12, or the rotary shaft 12 and the cutting blades 9 may be integrated as a whole. The cutting blades 9 do not necessarily make a pair as shown in FIG. 5 and FIG. 6. Also, a border between the region L and the region R in FIG. 3 does not necessarily coincides with the center of the rotary shaft 12 in the longitudinal direction. Further, one of the rotary shaft elements 21 shown in FIG. 4 may be disposed across the border between the region L and the region R. In this case, in the rotary shaft element 21 disposed at the position, the cutting blades 9 on one end side are the L type, and the cutting blades 9 on the other end side are the R type.

The exhaust port 27 in the lid member 24 is not necessarily essential. Even when the exhaust port 27 is not formed in the lid member 24, the airflow P, Q in FIG. 5 and FIG. 6 is generated, and negative pressure is still generated due to the Bernoulli's principle. Also, when the exhaust port 27 is provided, the number of the exhaust ports 27 is not limited to one for each of both sides. More than one exhaust port 27 may be provided in each of the lid members 24. Further, in the embodiment, the exhaust port 27 is provided at the position separated from the hole 26. However, the hole 26 may also serve as the exhaust port 27.

A shutter may be provided in the exhaust port 27. In that case, the shutter is open at the transfer stage, and the shutter is closed when the wet agitation is carried out. Because of this, leakage of the base powder from the transfer port 16 at the transfer stage is prevented more favorably, and, at the same time, leakage of the base powder and the solvent from the exhaust port 27 at the time of the wet agitation is also prevented. However, even in the configuration where the shutter is not provided and the exhaust port 27 is left open, leakage of the base powder and the solvent from the exhaust port 27 is not a big problem. By setting the position of the exhaust port 27 as described earlier, it is possible to prevent leakage of materials to be agitated from the exhaust port 27. Further, by providing a so-called "labyrinth structure" in places that continue from an outer side of the exhaust port 27, it is possible to prevent leakage of a solid component and a liquid component while allowing air to escape from the exhaust port 27.

Moreover, the inclined surface 23 may not necessarily be a flat plane. When the inclined surface 23 is not a flat plane, the elevation angle is different depending on locations within the inclined surface 23. In this case, it is determined whether or not the elevation angle is in a preferred range by seeing, for example, whether or not an area of the inclined surface 23 occupied by a portion where the elevation angle is within the favorable range has a given ratio (for example, 80%) or higher. Alternatively, an average value of the elevation angle in the entire inclined surface 23 may be used for the determination. Further, with the manufacturing apparatus 10 for the granulated body according to the embodiment, it is possible to manufacture not only the granulated body of a negative electrode active material, but also a granulated body of a positive electrode active material. Further, it is possible to manufacture a granulated body other than an electrode material for a battery.

What is claimed is:

1. A manufacturing method for a granulated body, the manufacturing method comprising:
    supplying powder agitated in a dry agitator to a wet agitator; and
    agitating the powder supplied from the dry agitator with a liquid component in the wet agitator by rotation of blades so as to form a granulated body, wherein:
        the blades are rotated when the powder is supplied to the wet agitator from the dry agitator;
        the dry agitator agitates the powder in a dry state;
        the wet agitator is positioned below the dry agitator;
        the wet agitator includes an agitation chamber and the blades that rotate inside the agitation chamber around a center axis orthogonal to a direction in which the powder is supplied;
        the blades include a first blade in a region on a first end portion side of the agitation chamber, and a second blade in a region on a second end portion side of the agitation chamber, the second end portion side being positioned across the agitation chamber from the first end portion side in a direction along the center axis;
        a first surface of the first blade becomes a front side as the first blade rotates around the center axis, the first surface includes a first inclined surface directed towards the first end portion side from the second end portion side; and
        a second surface of the second blade becomes a front side as the second blade rotates around the center axis, the second surface includes a second inclined surface directed towards the second end portion side from the first end portion side.

2. The manufacturing method according to claim 1, wherein:
    the agitation chamber has a cylindrical shape; and
    the center axis is parallel to a horizontal direction and coincides with a center axis of the cylindrical shape.

3. The manufacturing method according to claim 2, wherein:
    the agitation chamber includes a surface in the region on the first end portion side and a surface in the region on the second end portion side;
    a first exhaust port is provided in the surface in the region on the first end portion side; and
    a second exhaust port is provided in the surface in the region on the second end portion side.

4. The manufacturing method according to claim 1, wherein rotational speed of the blades is 100 rpm or lower when the powder is supplied from the dry agitator.

5. The manufacturing method according to claim 1, wherein rotational speed of the blades is 60 rpm or lower when the powder is supplied from the dry agitator.

6. The manufacturing method according to claim 1, wherein:
    a first transfer port is open in a side surface of the dry agitator;
    a second transfer port is open in a side surface of the wet agitator;
    the first transfer port and the second transfer port communicate with each other;
    a shutter is provided between the side surface of the dry agitator and the side surface of the wet agitator;
    the shutter opens and closes the first transfer port and the second transfer port; and
    the manufacturing method further comprising rotating the blades when the shutter is closed.

7. A manufacturing apparatus for a granulated body, the apparatus comprising:
    a dry agitator configured to agitate powder in a dry state; and
    a wet agitator that is positioned below the dry agitator and configured to agitate the powder supplied from the dry agitator with a liquid component in the wet agitator by rotation of blades so as to form a granulated body, wherein:
        the wet agitator includes an agitation chamber and the blades rotate inside the agitation chamber around a center axis that is parallel to a horizontal direction;
        the blades include a first blade in a region on a first end portion side of the agitation chamber, and a second blade in a region on a second end portion side of the agitation chamber, the second end portion side being positioned across the agitation chamber from the first end portion side in a direction along the center axis, wherein the blades project in a radially outward direction from a rotating shaft disposed along the center axis;
        a first surface of the first blade is a front side of the first blade when the first blade rotates around the center axis, the first surface includes a first inclined surface directed towards the first end portion side from the second end portion side, so that the first inclined surface is formed at a distal end of the first blade, and wherein an angle of the first inclined surface with respect to the radially outward direction is less than 90°; and
        a second surface of the second blade is a front side of the second blade when the second blade rotates around the center axis, the second surface includes a second inclined surface directed towards the second end portion side from the first end portion side, so that the second inclined surface is formed at a distal end of the second blade, and wherein an angle of the second inclined surface with respect to the radially outward direction is less than 90°.

8. The manufacturing apparatus according to claim 7, wherein:
    the agitation chamber is a cylindrical shape; and
    the center axis coincides with a center axis of the cylindrical shape.

9. The manufacturing apparatus according to claim 7, wherein:
    an angle of inclination of the first inclined surface from a vertical plane with respect to the center axis is in a range from 30° to 60°; and
    an angle of inclination of the second inclined surface from the vertical plane with respect to the center axis is in the range from 30° to 60°.

10. The manufacturing apparatus according to claim 7, wherein:
the agitation chamber includes a surface in the region on the first end portion side and a surface in the region on the second end portion side;
a first exhaust port is provided in the surface in the region on the first end portion side; and
a second exhaust port is provided in the surface in the region on the second end portion side.

11. The manufacturing apparatus according to claim 7 further comprising a rotation control part configured to rotate the blades when the powder is supplied to the wet agitator from the dry agitator and when the wet agitator agitates the powder supplied from the dry agitator with the liquid component so as to form a granulated body.

12. The manufacturing apparatus according to claim 7, wherein:
a first transfer port is open in a side surface of the dry agitator;
a second transfer port is open in a side surface of the wet agitator; and
the first transfer port and the second transfer port communicate with each other,
the apparatus further comprising:
a shutter that is provided between the side surface of the dry agitator and the side surface of the wet agitator, the shutter being configured to open and close the first transfer port and the second transfer port; and
a rotation control part configured to rotate the blades when the shutter is closed.

13. The manufacturing apparatus according to claim 10, wherein:
the first exhaust port is positioned within a range of a circle defined by a cylindrical shape on the surface in the region on the first end portion side, the range excluding 20% on a lower side in a vertical upper-lower direction, and also within a range of the circle excluding 20% on an upper side in the vertical upper-lower direction; and
the second exhaust port is positioned within a range of the circle on the surface in the region on the second end portion side, the range excluding 20% on a lower side in the vertical upper-lower direction, and also within a range of the circle excluding 20% on an upper side in the vertical upper-lower direction.

* * * * *